United States Patent [19]

Torimoto

[11] Patent Number: 4,557,108
[45] Date of Patent: Dec. 10, 1985

[54] COMBUSTION APPARATUS FOR VEHICLE

[75] Inventor: Koichi Torimoto, Himeji, Japan

[73] Assignee: Mitsubishi Denki Kabushiki Kaisha, Tokyo, Japan

[21] Appl. No.: 666,224

[22] Filed: Oct. 29, 1984

[30] Foreign Application Priority Data

Oct. 31, 1983 [JP] Japan ................. 58-170519

[51] Int. Cl.$^4$ .............................. F01N 3/02
[52] U.S. Cl. ........................... 60/286; 55/283; 55/466; 55/DIG. 30; 60/303; 60/311
[58] Field of Search ............... 60/286, 303, 311; 55/DIG. 30, 283, 466

[56] References Cited

U.S. PATENT DOCUMENTS 4,281,512  8/1981  Mills .................. 55/DIG. 30
4,335,574  6/1982  Sato ..................... 60/311
4,345,431  8/1982  Suzuki ................... 60/286
4,450,682  5/1984  Sato ..................... 60/311

Primary Examiner—Douglas Hart
Attorney, Agent, or Firm—Leydig, Voit & Mayer

[57] ABSTRACT

A combustion apparatus for a vehicle for regenerating a filter provided in an exhaust gas passage of an engine by burning and removing fine particles in the exhaust gas comprising an air supply passage for coaxially supplying air along the outer periphery of a fuel injection nozzle, a shut-off valve mounted at the downstream side end of said combustion chamber for preventing reverse flow of the exhaust gas, and a controller for allowing the inflow of the coaxial air for a predetermined period of time after stopping the fuel supply from the fuel injection nozzle and then closing the shut-off valve.

4 Claims, 3 Drawing Figures

COMBUSTION APPARATUS FOR VEHICLE

BACKGROUND OF THE INVENTION

1. Field of the Invention

The present invention relates to a combustion apparatus for a vehicle and, more particularly, to a combustion apparatus for removing fine particles existing in exhaust gas collected by a filter, for example, provided in an exhaust gas passage of a diesel engine.

2. Description of the Prior Art

The present invention contemplates to efficiently regenerate a filter so as to remove fine particles existing in the exhaust gas of a diesel engine as described above, since there is no apparatus of this type at present. It is desirable to develop such an apparatus for the following reasons.

The fine particles contained in the exhaust gas of diesel engine are harmful to human's health, and, accordingly, the quantity of exhausted fine particles from the diesel engine may be suppressed by law.

Two means are considered as a method for reducing the quantity of exhausted fine particles from a diesel engine. One is to reduce the quantity of the exhausted fine particles by improving the diesel engine itself. This is ideal, but this method can be expected to reduce only a small amount of the fine particles exhausted from the diesel engine at present, and cannot be relied on to sufficiently reduce the fine particles if the law for suppressing the exhausted fine particles will be severely stipulated. The other method is to filter the fine particles by providing a filter, for example, of ceramic honeycomb in the exhaust gas system of the diesel engine. This method has a drawback that, to prevent the filter from clogging, the filter has to be regenerated. The regeneration of this filter is based on the following principle.

The main ingredient of fine particles which adheres to the filter is carbon. The ignition temperature of carbon is approx. 550° C. Therefore, when the exhaust gas of the engine is heated to temperatures higher than 550° C., the fine particles become carbon dioxide so that the filter can be regenerated. However, the temperature of the exhaust gas of a diesel engine used in ordinary automobiles when operated at normal speeds is approx. 400° C. at the maximum value, and accordingly, it is impossible to regenerate the filter. Thus, it is required to add a certain engine exhaust gas heater, which is used to regenerate the filter. It has been considered as a regenerator for the filter to raise the temperature of the exhaust gas by throttling the air supply to the engine or to provide a regenerative burner, i.e., a combustion apparatus. The regenerative burner is possible at present, but the burner has such drawbacks or disadvantages that the temperature of a burner nozzle, that is, a fuel injection nozzle, is not only raised by means of thermal radiation from the burning flame and thermal conduction from a combustion chamber at the regenerative time, but is also continuously raised by thermal conduction from the high temperature of the air enclosed in the combustion chamber as well as the high temperature of the combustion chamber itself when a shut-off valve for preventing the reverse flow of the exhaust gas is closed during the regeneration or immediately after the termination of the regeneration process whereby, the temperature of the air in the vicinity of the spraying port of the nozzle becomes 100° C. or higher, with the result that unburned fuel adheres to the end face of the nozzle, the adhered unburned fuel being readily converted into tar and hence causing the nozzle to be clogged during or after the termination of the regeneration process.

SUMMARY OF THE INVENTION

An object of the present invention is to provide a combustion apparatus for a vehicle wherein the temperature rise of a fuel spraying nozzle is lowered, thereby preventing unburned fuel which adheres to the nozzle from turning into tar and clogging up the nozzle.

In order to achieve the above and other objects, there is provided, according to the present invention, a combustion apparatus for a vehicle wherein an upstream coaxial air supply passage is formed in contact with the outside of a nozzle, the upstream coaxial air is inflowed for a predetermined period of time even after the termination of regeneration, a shut-off valve is thereafter closed, thereby reducing the temperature rise of the nozzle during the non-regeneration time and thereby preventing tar due to unburned fuel adhering to the nozzle from forming on the nozzle and clogging the same.

DESCRIPTION OF THE PREFERRED EMBODIMENT

An embodiment of the present invention will be described with reference to FIGS. 1 to 3.

Figure 1:
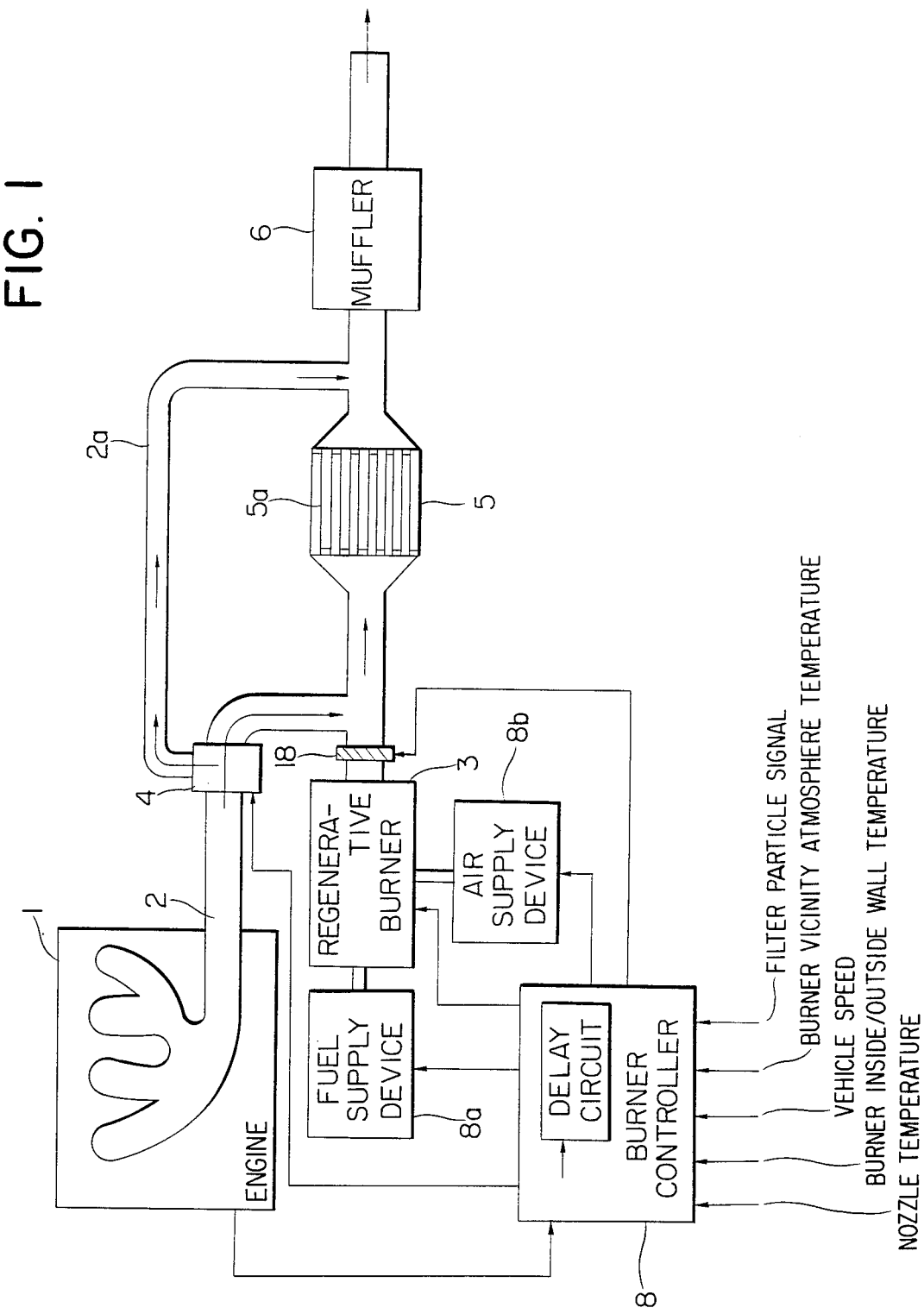
FIG. 1 is an explanatory view schematically showing the construction of a combustion apparatus for a vehicle according to an embodiment of the present invention.

In FIG. 1, numeral 1 designates a diesel engine, numeral 2 an exhaust manifold of the engine, numeral 3 a regenerative burner as a combustion apparatus, numeral 4 a changeover valve for switching the passage through which engine exhaust gases flow during a regenerative time and a non-regenerative time, and numeral 5 a filter container provided in one of the engine exhaust gas passages branched at the change over valve 4 for containing a fine particle filter 5a of a ceramic honeycomb structure. Numeral 6 designates a muffler, and numeral 8 designates a burner controller for producing output signals to a fuel supply device 8a and an air supply device 8b.

Figure 2:
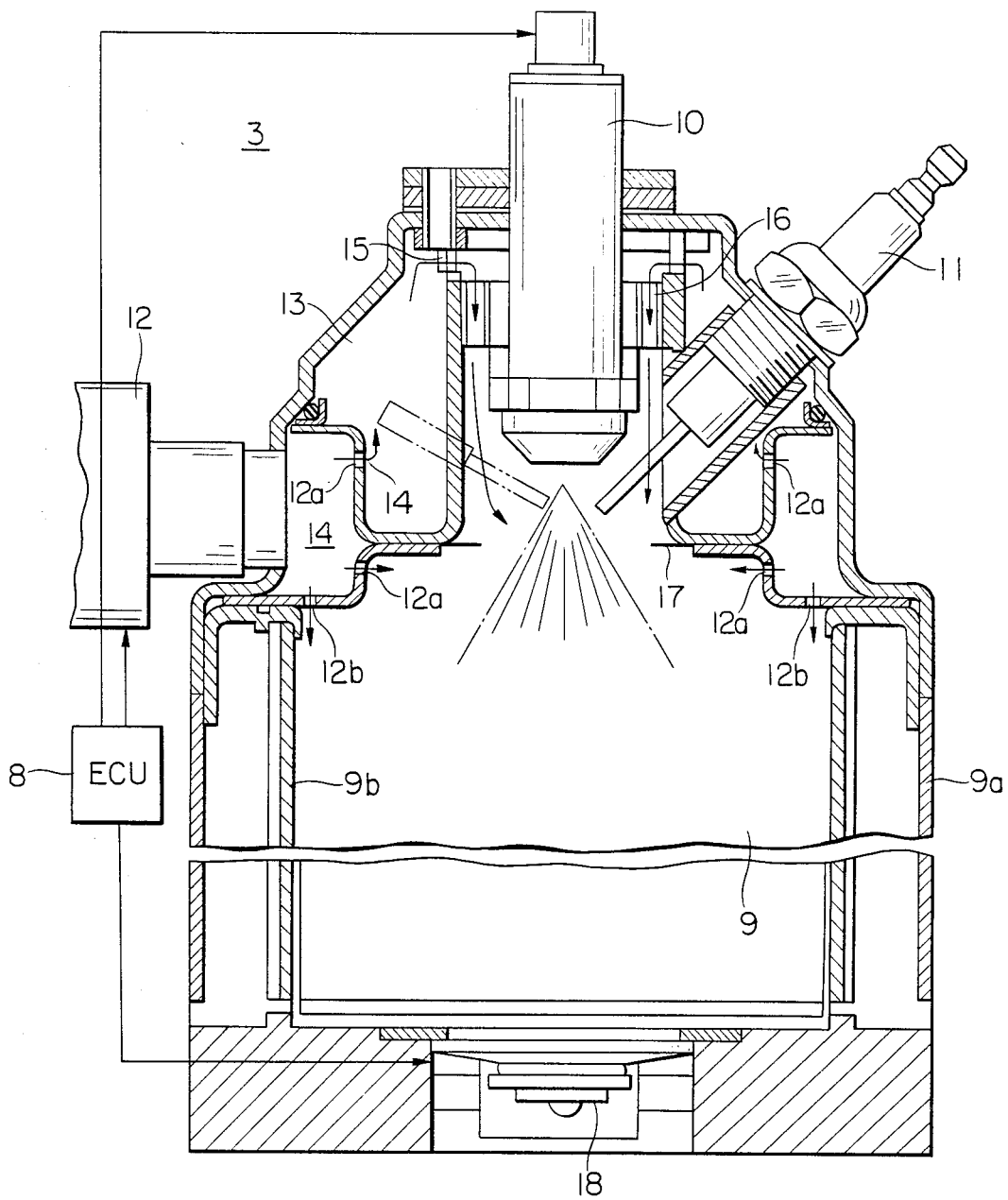
FIG. 2 is a sectional view showing a regenerative burner as a regeneration unit in a combustion apparatus shown in FIG. 1.

FIG. 2 shows the internal structure of the regenerative burner 3, wherein numeral 9 designates a combustion chamber having a coaxial double tube structure composed of an external combustion wall 9a and an internal adiabatic cylinder 9b, numeral 10 designates a 2-fluid injection nozzle (hereinbelow referred to as "a nozzle") provided at the upstream side end of the combustion chamber 9 for injecting combustible mixture gas. A coaxial air passage, through which air is flowed from the upstream of the nozzle toward the downstream, is formed on the outer periphery of the fuel injection nozzle 10. The nozzle 10 is formed with knurls or grooves on the outer periphery and end face thereof in the vicinity of a spraying port, thereby facilitating the blowing of unburned fuel which adhered to the nozzle by means of the coaxial air. Numeral 11 designates an ignition plug arranged in the vicinity of the nozzle at the downstream side of the fuel injection nozzle and mounted substantially tangentially to the combustion chamber 9, numeral 12 an air supply passage provided substantially tangentially to the combustion chamber 9 and having radial air hole 12a and an axial air hole 12b, numeral 13 an air passage having an inflow hole formed in contact with the air supply passage 12, namely, the upper radial air hole 12a, and an outflow hole 15 for flowing the coaxial air, numeral 16 a straightening plate formed of a plurality of radial members for straightening substantially in the axial direction the flow of air supplied from the outflow hole 15 between the inner peripheral walls of the air passage 13 in contact with the outer periphery of the nozzle 10, numeral 17 a flame holding plate for lifting a flame formed by throttling air fed under pressure in the axial direction and simultaneously inhibiting the flame to circulate to the vicinity of the nozzle, and numeral 18 a shut-off valve provided at the downstream side end of the combustion chamber 9 for preventing the exhaust gas from reversely flowing into the combustion chamber 9 at the regenerative time.

Figure 3:
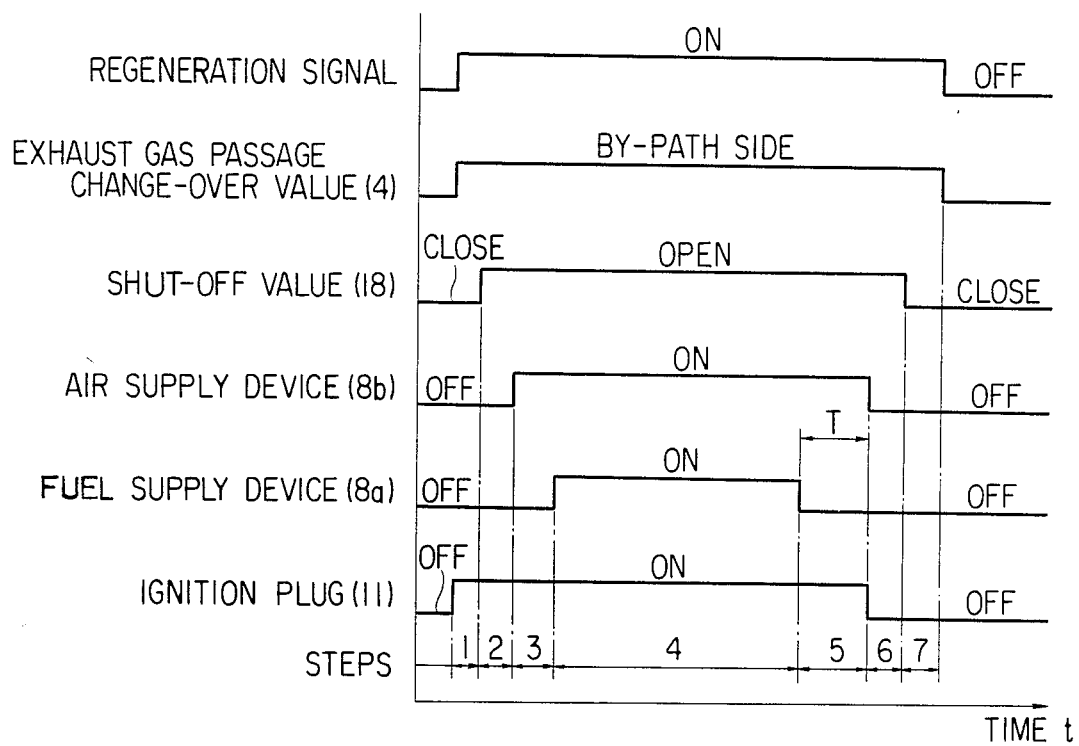
FIG. 3 is a sequential timechart showing the sequence of operations of components shown in FIGS. 1 and 2.

Now, the operations of the combustion apparatus of the present invention constructed as described above will be explained with reference to the sequence time-chart of FIG. 3 showing the sequence of the operations of the respective components shown in FIGS. 1 and 2.

In an ordinary operation, i.e., when a fine particle filter 5a is not regenerated (at the non-regenerative time), the engine exhaust gas exhausted from the engine 1 is exhausted from the muffler 6 into the atmospheric air through the exhaust manifold 2, the changeover valve 4, and the fine particle filter 5a. Thus, fine particles contained in the engine exhaust gas are filtered through the filter 5a, and adhered thereto. When the quantity of the fine particles adhered to the filter 5a increases, the pressure loss across the filters 5a increases, the combustion of the engine is deteriorated, and the engine power is lowered. Therefore, when the quantity of the fine particles adhered to the filter 5a increases, it is detected, the exhaust gas passage is switched by the changeover valve 4 to a bypass passage 2a, kerosense is then burned by the regenerative burner 3 to generate a temperatures of 550° or higher, and the heated gas is then fed into the filter 5a. Then, the fine particles accumulated in the filter 5a are burned to become carbon dioxides, exhausted into the atmosphere, and the filter 5a is thus regenerated.

Only the operation of the regenerative burner 3 of the above-described operations will now be explained. A combustible gas mixture of atomized (kerosene) fuel injected from the nozzle 10 and air which is made to flow substantially axially by the straightening plate 16, are mixed, led to a low speed zone formed between the flame hodling plate 17 and the nozzle 10, and ignited by the ignition plug 11, thus producing a flame. On the other hand, the nozzle 10 is heated and raised in temperature by means of radiation from the combustion flame and thermal conduction from the combustion chamber 9. However, since the flame is lifted by the coaxial flowed air due to the straightening plate 16 the radiation is substantially reduced, cooling is accelerated, and the temperature rise can be decreased. Further, since knurls or grooves are formed on the end face and outer periphery of the nozzle 10, the adhering strength of unburned fuel is reduced and the unburned fuel is readily blown of the nozzle 10 by the axial air.

In the burner, however, the combustion chamber 9 is cooled by the exterior air flow during travelling so that the temperature of the combustion gas decreases. To remedy against this phenomenon, a coaxial double tube structure is employed. When the shut-off valve 18 is closed during the regeneration or immediately after the termination of the regeneration, the temperature of the nozzle 10 abruptly rises by means of the thermal conduction from the combustion chamber 9 and high temperature atmosphere. Therefore, as shown in FIG. 3, the operation of the air supply device 8b is continued for a predetermined period of time T even after the operation of the fuel supply device 8a is stopped (which designates the end of the regeneration), which causes the axial air to be continually, supplied for the time T to prevent the high temperature atmospheric air in the combustion chamber 9 from heating the nozzle 10, whereby tar is prevented from forming on the nozzle and clogging the nozzle.

Accordingly, the nozzle temperature after the termination of the regeneration depends upon the temperature rise due to the thermal conduction from the combustion chamber, the cooling of the combustion chamber by the exterior air flow and the cooling of the nozzle and the combustion chamber by the axial air. Therefore, sensors for respectively detecting the nozzle temperature, the inner and outer wall temperatures of the combustion chamber, vehicle speed and combustion chamber vicinity atmospheric temperature are installed, and air supply times determined and tabulated as a function of the outputs of these sensors are stored in advance in the controller 8. Then, the accuracy can be further improved. Since the temperature rise of the nozzle at the non-regenerative time is greatest when the vehicle is stopped during the regeneration, it is most effective to continue supplying the air and then close the shut-off valve 18 even while the ignition key switch is turned off. Therefore, a delay circuit which cooperates with the ignition key switch is provided in the controller 8, whereby the coaxial air is flowed for a predetermined time even after the fuel supply to the burner B is stopped when the ignition key switch is turned off during the regeneration. More particularly, as shown in FIG. 3, when the key is turned off during the steps 1 and 4, the operation is switched over to the step 5, and stopped after the steps 6, 7 are complete.

As described above, the combustion apparatus wherein the changeover valve for selectively opening or closing both exhaust gas passages is provided at the branch of the exhaust gas passage, the filter for collecting carbon fine particles is provided at least at one of the exhaust gas passages, the combustion apparatus is provided at the upstream side of the filter, and the changeover valve is switched at the regenerative time thereby preventing the inflow of the exhaust gas to the filter is particularly effective. However, the present invention is not limited to the particular embodiment.

According to the present invention as described above, the combustion apparatus for the vehicle can collect and remove fine particles exhausted, for example, from a diesel engine, via the filter arranged in the exhaust gas system, prevent the filter from clogging, alleviate the temperature rise of the nozzle at the non-regenerative time and prevent tar from forming on the nozzle due to unburned fuel adhering to the nozzle and clogging of the nozzle.

What is claimed is:

1. A combustion apparatus for a vehicle for regenerating a filter provided in an exhaust gas passage of an engine by burning and removing fine particles in the exhaust gas comprising:

a combustion chamber;

a fuel injection nozzle provided at the upstream side end of said combustion chamber;

an ignition plug provided in the vicinity of said nozzle at the downstream side of said nozzle;

an air supply passage for supplying coaxial air from the upstream to the downstream of said nozzle along the outer periphery of said nozzle;

a shut-off valve mounted at the downstream side end of said combustion chamber for preventing reverse flow of the exhaust gas; and a controller for inflowing the coaxial air for a predetermined period of time after stopping the fuel supply from said nozzle and then closing said shut-off valve.

2. A combustion apparatus for a vehicle according to claim 1, wherein a nozzle temperature detecting sensor, combustion chamber inner and outer wall temperature detecting sensors, a vehicle speed sensor and a combustion apparatus vicinity atmosphere temperature sensor are provided at predetermined positions of said combustion apparatus or on the vehicle, and the air supply time after the regeneration is terminated is tabulated and stored in advance in said controller as a function of the outputs from said respective sensors.

3. A combustion apparatus for a vehicle according to claim 1, wherein said controller comprises a delay circuit cooperating with an ignition key switch, wherein when the ignition key switch is turned off during the regeneration cycle, the fuel supply is stopped, the coaxial air supply is continued for a predetermined period of time, and then the shut-off valve is closed.

4. A combustion apparatus for a vehicle according to claim 1, wherein said fuel injection nozzle is formed with knurls on the outer periphery and the end face thereof in the vicinity of the spraying port.

* * * * *